(12) United States Patent
Heikkilä et al.

(10) Patent No.: US 8,295,853 B2
(45) Date of Patent: Oct. 23, 2012

(54) METHOD AND SYSTEM FOR REFINING ACCURACY OF LOCATION POSITIONING

(75) Inventors: Timo Heikkilä, Hyvinkää (FI); Anssi Jakorinne, Hyvinkää (FI); Timo Kuisma, Turenki (FI); Jyrki Paananen, Hyvinkää (FI); Arno Hietanen, Helsinki (FI)

(73) Assignee: Glopos FZC, Dubai (AE)

( * ) Notice: Subject to any disclaimer, the term of this patent is extended or adjusted under 35 U.S.C. 154(b) by 500 days.

(21) Appl. No.: 12/618,063

(22) Filed: Nov. 13, 2009

(65) Prior Publication Data

US 2010/0120449 A1  May 13, 2010

(30) Foreign Application Priority Data

Nov. 13, 2008  (WO) ................ PCT/FI2008/050656

(51) Int. Cl.
*H04W 24/00* (2009.01)

(52) U.S. Cl. ................ 455/456.1; 455/456.6; 455/422.1

(58) Field of Classification Search ............... 455/456.6, 455/457, 422.1, 456.1, 456
See application file for complete search history.

(56) References Cited

U.S. PATENT DOCUMENTS

| | | | |
|---|---|---|---|
| 6,941,145 B2 * | 9/2005 | Ogino et al. ............... | 455/456.1 |
| 2001/0022558 A1 * | 9/2001 | Karr et al. ..................... | 342/450 |
| 2004/0104841 A1 * | 6/2004 | Syrjarinne ............... | 342/357.13 |
| 2004/0232277 A1 * | 11/2004 | Gehlot et al. ................ | 244/3.19 |
| 2006/0178154 A1 * | 8/2006 | Farmer ........................ | 455/456.1 |
| 2007/0049286 A1 * | 3/2007 | Kim et al. .................. | 455/456.1 |
| 2008/0096578 A1 * | 4/2008 | Lin et al. .................... | 455/456.1 |
| 2009/0203394 A1 * | 8/2009 | Shaffer et al. ................. | 455/525 |

FOREIGN PATENT DOCUMENTS

WO  WO 2006/043123  4/2006

OTHER PUBLICATIONS

International Search Report for International Patent Application No. PCT/FI2008/050656 dated Sep. 1, 2009.

* cited by examiner

*Primary Examiner* — Kamran Afshar
*Assistant Examiner* — Marisol Fahnert
(74) *Attorney, Agent, or Firm* — Pearl Cohen Zedek Latzer, LLP (57) ABSTRACT

A method and system for accurately determining the location of the mobile device (10) is disclosed. In the mapping phase collected reference positioning data and collected cell data are used to map a covered area estimation and in the actual location determination phase the covered area estimation is calculated from actual environment data received through wireless cellular communication network (11, 12) and possibly but not necessarily from external databases (17, 19). The covered area estimation comprises at least some of the following calculations: (i) estimation of base station location, (ii) estimation of transmission range, (iii) estimation of signal map and (iv) estimation of area type. The actual location of the mobile device (10) is determined from the covered area estimation based on relative comparison between the actual environment data and estimations (i)-(iv) and weight numbers resulted from the comparison. During the both phases a database is stored in the server (14) and updated whenever new environment data is received.

20 Claims, 7 Drawing Sheets

METHOD AND SYSTEM FOR REFINING ACCURACY OF LOCATION POSITIONING

CROSS-REFERENCE TO RELATED APPLICATIONS

This application claims priority from International Patent Application No. PCT/FI2008/050656, filed Nov. 13, 2008, which is hereby incorporated by reference.

TECHNICAL FIELD OF THE INVENTION

This invention relates generally to a method and system for determining the location of the mobile device comprising mobile positioning technology. More particularly the invention relates to a method and system for accurately determining the location of the mobile device in which the location positioning is refined by environment data received through wireless cellular communication network and optionally from external databases.

BACKGROUND OF THE INVENTION

Location tracking devices and other such mobile terminals typically comprise satellite-based location determination functionality, e.g. a receiver for global positioning system (GPS) and to some extent cellular communication functionality, e.g. transceiver for collecting cell data from nearby cells/base stations and reporting it to a receiver at the remote location. To determine a location, a GPS receiver must have current almanac data and ephemeris data for at least three appropriate satellites and the receiver must have an initial estimate of its location. However, the reception of signals from the satellites easily suffers from interruptions caused by landscape obstructions such as geographic features, buildings, trees, etc. Because location tracking devices are often operated in environments, such as cities and urban areas, wherein GPS signal reception will be intermittent, this can result in poor performance of the location tracking system.

Documents WO 2008/080226, US 200810171557, EP 1548456 and U.S. Pat. No. 7,215,967 address the weakness of GPS-based location tracking devices and other such mobile terminals and propose assisted GPS (AGPS) to update the almanac and/or ephemeris data in order to improve performance of such devices. AGPS systems exploit remote terrestrial stations in locations in which good reception of satellite signals is expected and assistance data based on received signals are then transmitted e.g. via a cellular communication network to the mobile terminals. The start-up of the GPS-receiver typically requires the initial estimate of its location and this process takes several minutes (so called cold start time). In order to speed up the start-up of the GPS-receiver the cited documents present that the remote/mobile terrestrial stations produce assistance data based on identifiers of cellular network base stations and time delay data received from the cellular network base stations, and this data is used to improve the initial location position estimate. Time delay data which is available from the base station is used to estimate the distance between the location tracking device and the base station. To determine location estimates from the base station delay data, it is necessary to know the location of the base stations which is not always axiomatic due to security or other reasons. Finally, the location tracking device determines its location using the initial location estimation based on assistance data including identifiers, time delay data and valid GPS ephemeris data which it obtained from the remote terrestrial station. In the prior art systems the initial, actual and final location determination always requires reception of the satellite-based positioning data in each phase which is a time consuming task.

The location estimation procedures described above take into account assistance data that includes ephemeris data received from satellites and identifier and time delay data from the cellular base stations. This easily results in inaccurate location estimation because certain environment obstructions and their influences are ignored. The location estimation described above is based on performing an analysis of the location of the mobile terminal with respect to the locations of the base station and therefore if the exact base station locations are not available the resulting location estimation becomes distorted. The location estimation procedures described above do not estimate for each cell a location of a base station or a coverage area of the base station (area reached by the radio signal). The location estimation procedures described above don't make any estimation of a type of the cell with regard to landscape and cityscape, etc.

SUMMARY OF THE INVENTION

It is an objective of the invention to provide a method, system and module for determining the location of the mobile device that is configured to collect and transmit further at least positioning data and at least some wireless communication cell data. The method, system and module allow improved accuracy in location determination as well as reduced time in location determination.

The invention is characterised by what is presented in the independent claims. Embodiments of the invention are presented in dependent claims.

In accordance with a first aspect of the invention there is provided a method for determining a location of a mobile device configured to receive and transmit further at least positioning data and wireless communication cell data, the method comprising calculating for each of a plurality of cells a covered area estimation based on the received positioning data and the received cell data, completing the covered area estimation with additional data associated to the received position data and the received cell data, wherein the additional data represents at least a shape of the covered area estimation, receiving further actual cell data and relatively comparing the actual cell data to the cell data of the covered area estimation of each of the plurality of cells, selecting at least one cell from the plurality of cells having the actual cell data that matches to the cell data of the covered area estimation, and calculating the location of the mobile device from the position data of the covered area estimation of each selected cell.

In an embodiment of the method of the invention, completing comprises updating the cell data of the covered area estimation with the additional data that relates to the shape of the covered area estimation based on probability of signal strength within each of the plurality of cells. For example, the additional data comprises a piece of information received along environment data including cell data and/or a piece of information received along external environment data including cell data.

In an embodiment of the method of the invention, calculating the covered area estimation comprises calculating a location of a transmitting base station of each cell. It further comprises dividing each of the plurality of cells into sector areas and calculating for each sector area a sector formula representing signal strength levels inside the sector area and accumulating the covered area estimation from the sector formulas.

In accordance with a second aspect of the invention there is provided a method, comprising calculating for each of a plurality of cells a covered area model based on received positioning data and received cell data, calculating location information based on the received positioning data and the calculated covered area model, receiving further actual positioning data and comparing the calculated location information with the received actual positioning data, completing the covered area model with additional data associated to the received position data and the received cell data, wherein the additional data represents at least a shape of the covered area estimation, and storing the completed covered area model into a database.

In an embodiment of the invention there is provided a computer program comprising program code means adapted to perform any steps of method claims when the program is run on a processor.

In accordance with a third aspect of the invention there is provided a system for determining a location of a mobile device, wherein the mobile device is configured to collect and transmit further at least positioning data and wireless communication cell data received from a plurality of base station belonging to at least one cellular network, a server is configured to receive and store the positioning data and the cell data of each of the plurality of base stations associated to the position data, the server is configured to calculate for each of the plurality of base stations a covered area estimation based on the positioning data and the cell data, the server is configured to complete the covered area estimation with additional data associated to the received position data and the received cell data, wherein the additional data represents at least a shape of the covered area estimation the server is configured to further receive the cell data and the processor is configured to relatively compare the actual cell data to the cell data of the covered area estimation of each of the plurality of base stations, the server is configured to select at least one base station from the plurality of base stations having the actual cell data that matches to the cell data of the covered area estimation, the server is configured to calculate the location of the mobile device from the positioning data of the covered area estimation of each selected at least one base station, and the server configured to transmit further the location of the mobile device.

In accordance with a fourth aspect of the invention there is provided a module for determining a location of a mobile device configured to receive and transmit further at least positioning data and wireless communication cell data, the module comprising a receiver configured to receive and a memory configured to store the positioning data and the cell data of each of the plurality of base stations associated to the position data, an estimator configured to calculate for each of the plurality of base stations a covered area estimation based on the positioning data and the cell data, a modeller configured to complete the covered area estimation with additional data associated to the received position data and the received cell data, wherein the additional data represents at least a shape of the covered area estimation a locator configured to further receive actual cell data, the estimator configured to relatively compare the actual cell data to the cell data of the covered area estimation of each of the plurality of base stations, a selector configured to select at least one base station from the plurality of base stations having the actual cell data that matches to the cell data of the covered area estimation, and the locator configured to calculate the location of the mobile device from the positioning data of the covered area estimation of each selected at least one base station.

In an embodiment of the module of the invention the modeller is configured to complete the cell data of the covered area estimation with the additional data that relates to the shape of the covered area estimation based on probability of signal strength within each of the plurality of cells.

In an embodiment of the module of the invention the modeller is configured to calculate a location of a transmitting base station of each cell. Further in an embodiment of the module the modeller is configured to divide each of the plurality of cells into sector areas and calculate for each sector area a sector formula representing signal strength levels inside the sector area and accumulate the covered area estimation from the sector formulas.

In accordance with a fifth aspect of the invention there is provided a module, comprising a self-learning unit configured to communicate with a locator in order to calculate for each of a plurality of cells a covered area model based on received positioning data and received cell data, communicate with an estimator in order to calculate location information based on the received positioning data and the calculated covered area model, receive further actual positioning data, communicate with the estimator in order compare the calculated location information with the received actual positioning data, communicate with a modeller in order to complete the covered area model with additional data associated to the received position data and the received cell data, wherein the additional data represents at least a shape of the covered area estimation, and transmit the completed covered area model into a database for storing.

A benefit of the embodied invention is that it provides more accurate covered area estimation, base station location estimation and estimation of the type of the location area, and therefore more accurate location determination of the mobile device.

Another benefit of the embodied invention is that it provides more accurate and fast covered area estimation, since in the mapping phase, i.e. calculating estimation based on the positioning data and environment data including the cell data of each of a plurality of cells associated to the position data, it would be enough to map in the beginning only even a small part of the covered area of the base station in order to end up with an estimation of the whole covered area, of the shape of the whole covered area and of the transmitting signal strength of the base station.

Still another benefit of the embodied invention is that it provides more accurate location determination of the mobile device, since relative comparison between the covered area estimation and the actual environment data puts emphasis on the covered area estimations, and consequently the base stations/cells they represent, that scores the greatest accuracy as explained later. This also allows that effects caused by possible errors due to bad signal quality from part of the cells can be eliminated.

Still another benefit of the embodied invention is that it provides fast location determination of the mobile device. Since the further calculation of the covered area estimation, base station location estimation and estimation of the type of the location area is based on environment data including cell data received from the mobile device or on environment data including cell data received from the mobile device and external databases, there is no need to spend time for slow and unreliable satellite-based positioning data reception again once it has been done in the beginning of the process.

Still another benefit of the embodied invention is that it provides more accurate location determination of the mobile device, since it can exploit in addition to cell based data received from the base stations also external environment data from data bases and it can also deduce additional environment data from all the data that the mobile is configured to collect from nearby base stations.

Still another benefit of the embodied invention is that it provides a flexible location determination of the mobile device, since it can exploit cell data received from base stations from multiple network operators.

Still another benefit of the embodied invention is that it provides improved accuracy for location determination of the mobile device, since it carries out self-learning procedure by storing the positioning data and environment data including cell data that is collected during location determination procedure. Therefore, updated covered area models are available for the location determination. In this way an updatable database can be generated to parameters that refer to actual positioning data and corresponding environment data, and the database can be iterated by comparing each new environment data received to parameters already existing in the database. Further advantage of defining the covered area model according to an embodiment is that there is no need to store single positioning data with associated cell data to the model database and therefore memory and processing capacity is saved both in the mapping phase as well as in the actual location calculation phase.

Various embodiments of the invention together with additional objects and advantages will be best understood from the following description of specific embodiments when read in connection with the accompanying drawings.

The embodiments of the invention presented in this document are not to be interpreted to pose limitations to the applicability of the appended claims. The verb "comprise" or any other variation thereof is used in this document as an open limitation that does not exclude the existence of also unrecited features. The features recited in depending claims are mutually freely combinable unless otherwise explicitly stated. The terms "a", "an" and "at least one", as used herein, are defined as one or more than one. The term "plurality", as used herein, is defined as two or more than two. The terms "including" and "having", as used herein, are defined as comprising. The term "another", as used herein, is defined as at least a second or more. The terms "program", "computer program" and "computer instructions", as used herein, are defined as a sequence of instructions designed for execution on a processor.

BRIEF DESCRIPTION OF THE DRAWINGS

An embodiment of the invention will be described in detail below, by way of example only, with reference to the accompanying drawings, of which

DETAILED DESCRIPTION OF THE INVENTION

Figure 1A:
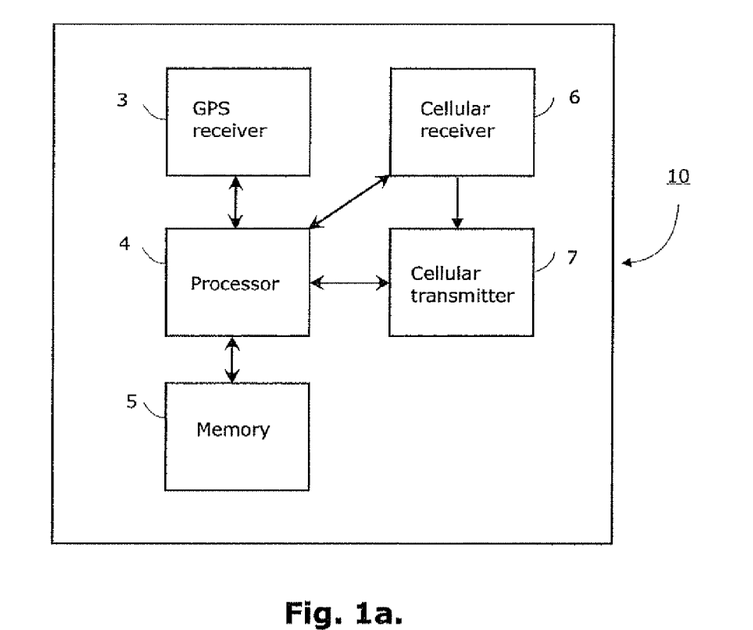
FIG. 1a depicts a block diagram of a mobile device according to an embodiment of the invention.

FIG. 1a shows a block diagram of a mobile device 10 according to an embodiment of the invention. The mobile device 10 may be e.g. a location tracking device or any other such device capable of indicating its present location upon request and/or continuously. The location of the mobile device 10 is monitored when it is moving or in stationary state. The mobile device 10 comprises first receiving means 3 for receiving positioning signals, e.g. satellite-based global positioning system (GPS) signals, and second receiving means 6 for receiving cellular communication network signals, e.g. GSM, GPRS, 3G, CDMA signals. Exemplary as shown in FIG. 1a, the first receiving means may comprise at least one GPS receiver 3 and associated antenna (not shown), and at least one cellular receiver 6 with associated antenna (not shown). The cellular receiver 6 may comprise one or more receiving means for different cellular communication networks and it is capable of receiving signals from cellular networks operated by different operators. The cellular receiver 6 and a cellular transmitter 7 are operable to communicate with a remote station 14 such as a server through a cellular communication network. The cellular transmitter 7 is operable to transmit data from the mobile device 10 to the remote station 14. The cellular receiver 6 and transmitter 7 may be integrated in a single component.

The mobile device 10 further comprises a processor 4 capable of controlling functions of the mobile device 10 and capable of performing steps of a stored program and program instructions received through the cellular receiver 6 and/or GPS receiver 3. The mobile device 10 may comprise a memory 5 capable of storing embedded stored programs and capable of storing data of signals received through GPS receiver 3 and cellular receiver 6. The processor 4 and the memory 5 can also be integrated together. The mobile device 10 may further comprise a sensor (not shown) for detecting certain environmental conditions inside or outside the mobile device. Components which combine functionality of any of the above mentioned elements may be used.

According to another embodiment the mobile device 10 comprises, instead of the first receiving means 3 for receiving satellite-based positioning signals, a third receiving means (not shown) configured to receive and collect information corresponding to positioning data, e.g. GPS coordinates. According to still another embodiment the mobile device 10 does not include the GPS receiver 3 and associated antenna, and it can be for example a GSM/GPRS, CDMA, or other cellular phone device which is configured to receive and collect the positioning data.

Figure 1B:
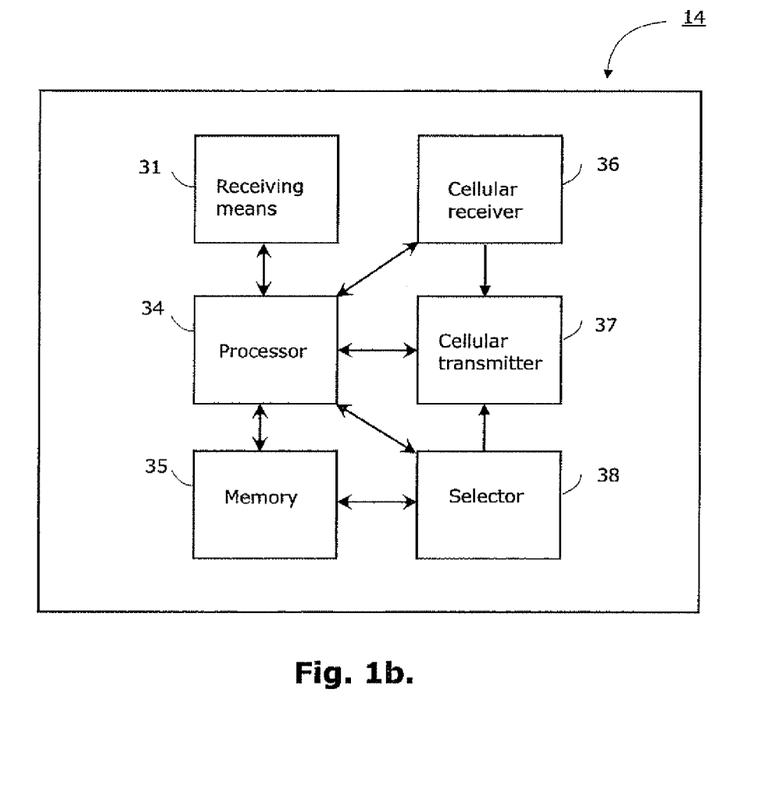
FIG. 1b depicts a block diagram of a module according to an embodiment of the invention.

FIG. 1b shows a block diagram of a server 14 or other such module according to an embodiment of the invention. The server 14 is connected to a cellular communication network, e.g. GSM, GPRS, 3G, CDMA, and it comprises first receiving means 36 to receive data from the mobile device 10 and transmitting means 37 to transmit data and/or program instructions to the mobile device 10. Exemplary as shown in FIG. 1b, the first receiving means may comprise at least one cellular receiver 36 with associated antenna (not shown) and at least one cellular transmitter 37 with associated antenna (not shown). Alternatively, the server 14 communicates with the mobile device 10 trough a datanet, such as Internet, operating via the cellular communication network whereto the mobile device 10 is connected. The server 14 may further comprise receiving means 31 configured to receive data from external sources 19 such as external databases. The server 14 comprises a processor 34 capable of controlling functions of the server 14 and performing steps of a stored program and program instructions which relates to e.g. analysing of the location of the mobile device 10. The server 14 comprises a memory 35 capable of storing stored programs and capable of storing data of signals received through cellular receiver 36 and the receiving means 36. The processor 34 is also capable of accumulating memory means, such as the memory 35 or database (not shown), with each piece of new data that it receives through the cellular receiver 36 and the receiving means 36 of external data and process this accumulated data on an on-going basis in order to update and/or correct the server database. The processor 4 and the memory 5 can also be integrated together. The server 14 further comprises selecting means 38 for making selections according to instructions from the processor 34.

Figure 2:
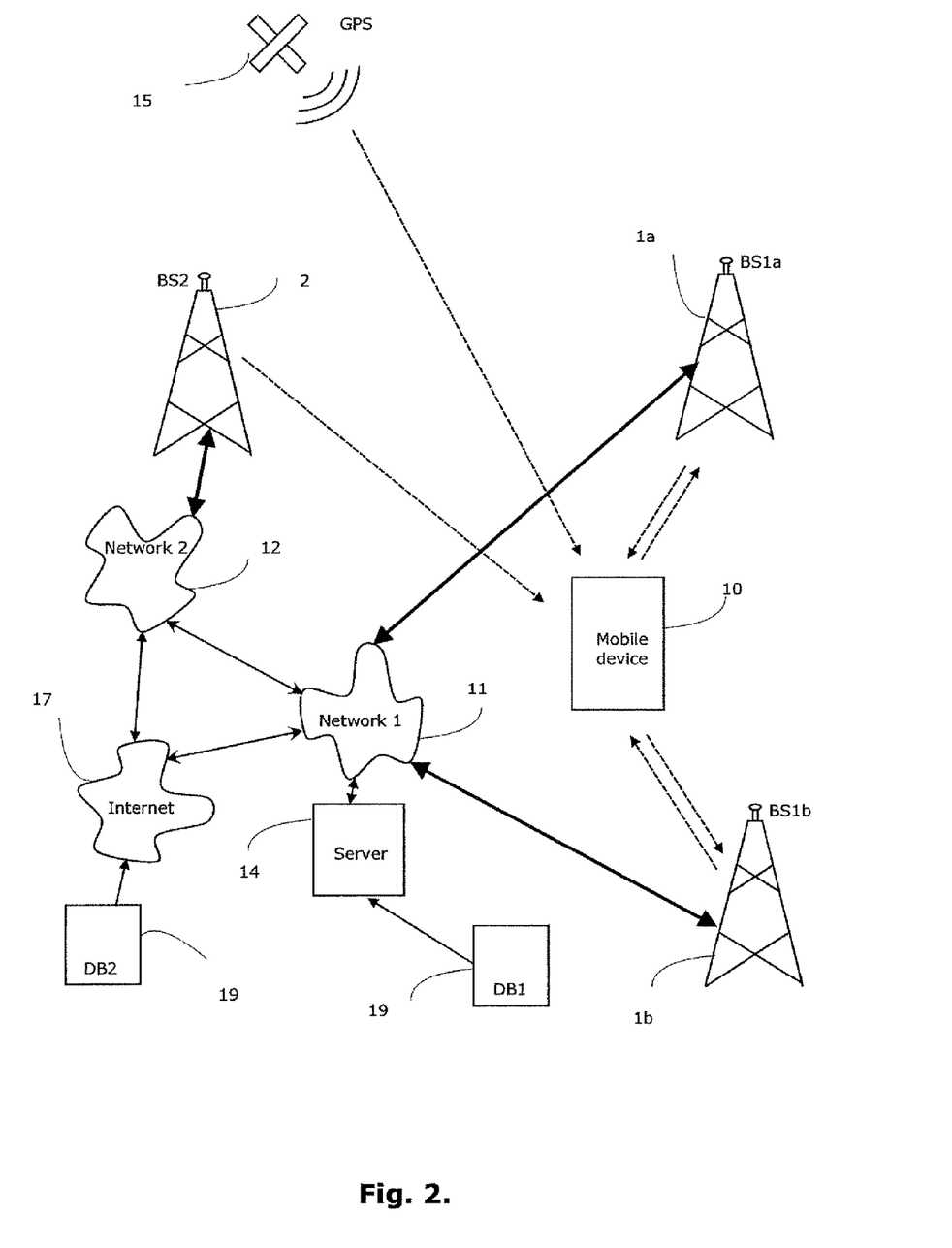
FIG. 2 depicts a schematic representation of a system according to an embodiment of the invention.

FIG. 2 shows a schematic view of a system according to an embodiment of the invention. The system comprises at least one mobile device 10, e.g. a location tracking device or other such mobile device, that is operable in at least one cellular communication network 11 via one or more base stations 1a, 1b. The system also comprises base stations 2 from other data communication networks 12 operated by different operators and/or technologies. The mobile device 10 is capable of receiving signals from all nearby base stations 1a, 1b, 2. According to an embodiment the system also employs at least one satellite-based positioning system, e.g. GPS, via satellites 15, preferably at least three satellites 15. Alternatively, the system is configured to receive and use positioning data corresponding to such positioning system. The server 14 is connected to the cellular communication network 11 directly as shown in FIG. 2 or via another data communication network 17 such as Internet. The mobile device 10 is capable of transmitting and receiving data with the server 14. It is capable of reporting its location to the server 14 by transmitting positioning data received from the satellite 15 and it is also capable of transmitting environment data including cell data that it has been collecting from any of nearby base stations 1a, 1b, 2. The mobile device 10 reports this data upon request, continuously, at regular intervals or occasionally. The server 14 may store all the received positioning data and environment data e.g. in the memory 35. Further, the server 14 is capable of receiving external data from external databases 19 via receiving means 31. The external databases may be connected to the server 14 directly or through Internet 17 or other such data communication network.

In a system according to an embodiment of the invention, the mobile device 10 is configured to receive at least positioning data received from e.g. the satellite 15 of the satellite-based positioning system and at least cell data of wireless cellular communication network received from a plurality of base stations 1a, 1b, 2 belonging to at least one cellular communication network 11, 12. According to another embodiment the system, the mobile device 10 comprises, instead of the first receiving means 3 for receiving satellite-based positioning signals, a third receiving means (not shown) configured to receive and collect information corresponding to positioning data, e.g. GPS coordinates. According to still another embodiment the system, mobile device 10 does not include the GPS receiver 3 and associated antenna, and it can for example a GSM/CPRS, CDMA, or other cellular phone device which is configured to receive and collect the positioning data.

In the system in the beginning of the mapping phase, the mobile device 10 is configured to collect simultaneously the positioning data and the cell data associated to said positioning data. The mobile device 10 is configured to transmit further the collected positioning data and environment data including cell data at least to the server 14. In the following GPS is used as an example of the satellite-based signals and GSM as cell based signals. The positioning data, e.g. GPS coordinates, is received among the ephemeris data that the satellite 15 transmits. The environment data including cell data may comprise area identification data, such as mobile country code (MCC), mobile network code (MNC), local area code (LAC), cell identification (CID) and/or other such data, that the plurality of the base stations 1a, 1b, 2 transmit. The environment data including cell data may also comprise data relating to each of the plurality of the base stations/cells 1a, 1b, 2, such as receiver signal strength (RxLev), timing advance (TA), radio frequency (RF), absolute radio frequency channel number (ARFCN) and/or other such data, that the plurality of the base stations 1a, 1b, 2 transmit. This environment data including cell data is collected from each nearby base station 1a, 1b, 1c for each GPS position coordinates and then the mobile device 10 transmits it to the server 14. Instead of GPS position coordinates, corresponding positioning coordinates received from any other positioning system known in the art may be used. This applies throughout this description, since GPS coordinates are used only as exemplary position coordinates.

The server 14 comprises the cellular receiver 36 configured to receive the positioning data and environment data including cell data of each of the plurality of base stations 1a, 1b, 2 associated to the position data. The server 14 is configured to store this data as a database in the memory 35. Each new piece of received data is used to update the database in order to improve its accuracy. This new data can include environment data concerning physical changes in construction of base stations performed by the operator. The more the positioning data includes GPS coordinates for each base station/cell 1a, 1b, 2, the better estimations for location determination in the mapping phase can be expected. However, accurate estimation can be done even with a very limited number of coordinates. During the mapping phase the server 14 can improve the collected database so that it makes location determination tests by comparing the current database with currently received positioning coordinates and consequently optimizes its data parameters.

The server 14 comprises the processor 34 that is configured to calculate a covered area estimation for each of the plurality of base stations/cells 1a, 1b, 2 based on the positioning data and the environment data including the cell data that is stored in the memory 35. According to an embodiment the covered area estimation for each cell comprises at least some of the following calculations: (i) calculation of a location estimation of the transmitting base station 1a, 1b, 2, (ii) transmission range estimation, (iii) estimation of size and shape of the covered area, i.e. signal map of the area reached by the radio signal, and (iv) estimation of the area type. The estimation of size and shape of the covered area is based on data relating to each of the plurality of the base stations/cells 1a, 1b, 2, such as receiver signal strength (RxLev), timing advance (TA), radio frequency (RF), absolute radio frequency channel number (ARFCN), area type and/or other such data. In the estimation of size and shape of the covered area the updated database can be used to reshape the covered area estimation to meet the most recent accuracy, e.g. if the construction of base station is changed. In these mapping phase calculations also external data from external sources 19 (as described later) can be used to give extra accuracy to the covered area estimation calculations. In the covered area estimation the calculation of a location estimation of the transmitting base station 1a, 1b, 2, the transmitting range estimation (i.e. estimation of transmitting signal strength) and the estimation of size and shape of the covered area can be done even if just few GPS coordinates and cell data is available from a small part of the whole actual covered area. The updatable database of the server 14 and the external databases 19 can be used to serve as a basis for calculating the covered area estimation that accurately resembles the actual covered area in this case. In calculation of the estimation of area type the server 14 may use environment data including cell data that it receives from the mobile device 10. The environment data includes such data as signal loss over various ranges, signal loss over a certain distance, number of base stations, distribution (density) of base stations and types of base stations, etc. The environment data may include area type data such as area size, small/medium/big city, rural area, mountainous/hilly/flat area, emptiness area, etc. Further, in the calculation of the estimation of area type the server 14 may use environment data received from external sources 19. The environment data may also include such data as population density in the area, land topography in the area, city size, and other such information in order to integrate this data to calculations of the covered area estimation comprising (i) the location estimation of the transmitting base station 1a, 1b, 2, (ii) transmission range estimation, (iii) estimation of size and shape of the covered area, and (iv) estimation of area type.

At the end of the mapping phase there is achieved as a result of calculation steps (i)-(iv) the covered area estimation that is based on the positioning data and the environment data including cell data described above. The actual location determination phase as described below may follow the above described mapping phase or it can be a separate procedure that is performed one or more times using the positioning data and the environment data including cell data that is resulted from a separate mapping phase.

The server 14 is configured to further receive actual environment data including cell data from the mobile device 10 that has collected the data in the same way as in the mapping phase, except that any positioning data, e.g. GPS coordinates, is not needed. In the actual location determination phase the accuracy of each piece of environment data including cell data of the covered area estimation resulting from the mapping phase is scored against the actual environment data including cell data that is received during the actual location determination phase. According to an embodiment of the invention in the processor 34 of the server 14 actual environment data, such as actual receiver signal strength (RxLev), actual timing advance (TA), actual radio frequency (RF), actual absolute radio frequency channel number (ARFCN) and/or other such data, is compared in relation to individual steps of the covered area estimation (i) the location estimation of the transmitting base station 1a, 1b, 2, (ii) transmission range estimation, (iii) estimation of size and shape of the covered area, and (iv) estimation of area type. Comparing the actual environment data in relation to each step (i)-(iv) separately forms the basis for evaluating each step (i)-(iv) of the covered area estimation. This comparison reveals how much weight is worth putting to each step (i)-(iv). This allows to emphasize the covered area estimations of those cells whose all steps (i)-(iv) score best with the actual environment data. Less weight is put to those covered area estimations, and corresponding cells, that score badly, because they seem to be inaccurate. These weights can be represented by weight numbers (e.g. percentage) and these weight numbers are used when calculating a final location determination. In this way emphasis can be put on the covered area estimations, and consequently the base stations/cells they represent, that give the greatest accuracy. This also allows that effects caused by possible errors due to bad signal quality from part of the cells can be eliminated. Such errors may arise for example in situation having lots of high buildings in one direction or being in the cellar. Due to the relative nature of the accuracy scoring, even if all signals are weakened (e.g. in the cellar), the errors even out each other still leading to a rather accurate calculation of the location determination. Also the external data from the external databases 19 can be used in the relative comparison described above. The actual location estimate of the mobile device 10 is determined from the covered area estimation based on relative comparison between the actual environment data and estimations (i)-(iv) and weight numbers resulted from the comparison.

The actual environment data including cell data that is received by the server 14 in the location determination phase is also stored in the memory 35 in order to update and/or correct the database comprising collected data as earlier described. The server 14 carries out self-learning procedure by storing the positioning data and environment data including cell data that is collected during the mapping phase and the actual location determination phase. In the mapping phase (calculations of the covered area estimation) there is collected the positioning data and environment data including cell data and in the actual location determination phase (calculations of the actual location) there is collected environment data including cell data. In this way an updatable database can be generated to parameters that refer to actual positioning data and corresponding environment data, and the database can be iterated by comparing each new environment data received to parameters already existing in the database.

After the relative comparison (scoring) of the actual environment data to the environment data of the covered area estimation of each of the plurality of base stations, the server 14 is configured to select at least one base station from the plurality of base stations having the actual environment data that matches best to the environment data of the covered area estimation. The server 14 comprises selecting means 38, that can be also integrated to processor and/or memory functions of the server 14, for selecting the base stations/cells that scored best in the relative comparison taking into account the weight numbers described above. The server 14 can identify the positioning data of the covered area estimations for the selected base stations from the updatable database. Then the server 14 is configured to calculate the location of the mobile device from the positioning data of the covered area estimation of each selected at least one base station taking into account the weight numbers described above. This can be done by calculating a distance of the mobile device 10 from each selected base station. The server 14 can then transmit the location data of the mobile device to the mobile device 10 or to other device to inform the user.

In a module 14 according to an embodiment of the invention in the mapping phase a receiver 36 is configured to receive and a memory 35 is configured to store the positioning data and environment data including the cell data of each of the plurality of base stations 1a, 1b, 2 associated to the position data. A processor 34 is configured to calculate for each of the plurality of base stations 1a, 1b, 2a covered area estimation based on the positioning data and the environment data including the cell data. In the location determination phase the receiver 36 is further configured to receive actual environment data including cell data and the processor 34 is configured to relatively compare the actual environment data to the environment data of the covered area estimation of each of the plurality of base stations. A selector 38 is configured to select at least one base station from the plurality of base stations 1a, 1b, 2 that has the actual environment data that matches to the environment data of the covered area estimation. Then the processor 34 is configured to calculate the location of the mobile device from the positioning data of the covered area estimation of each selected at least one base station. The module 14 may comprise receiving means 31 for receiving environment data from external databases 19. All the functionality and details described in association with the server 14 in the system above are valid for the module, too.

Figure 3:
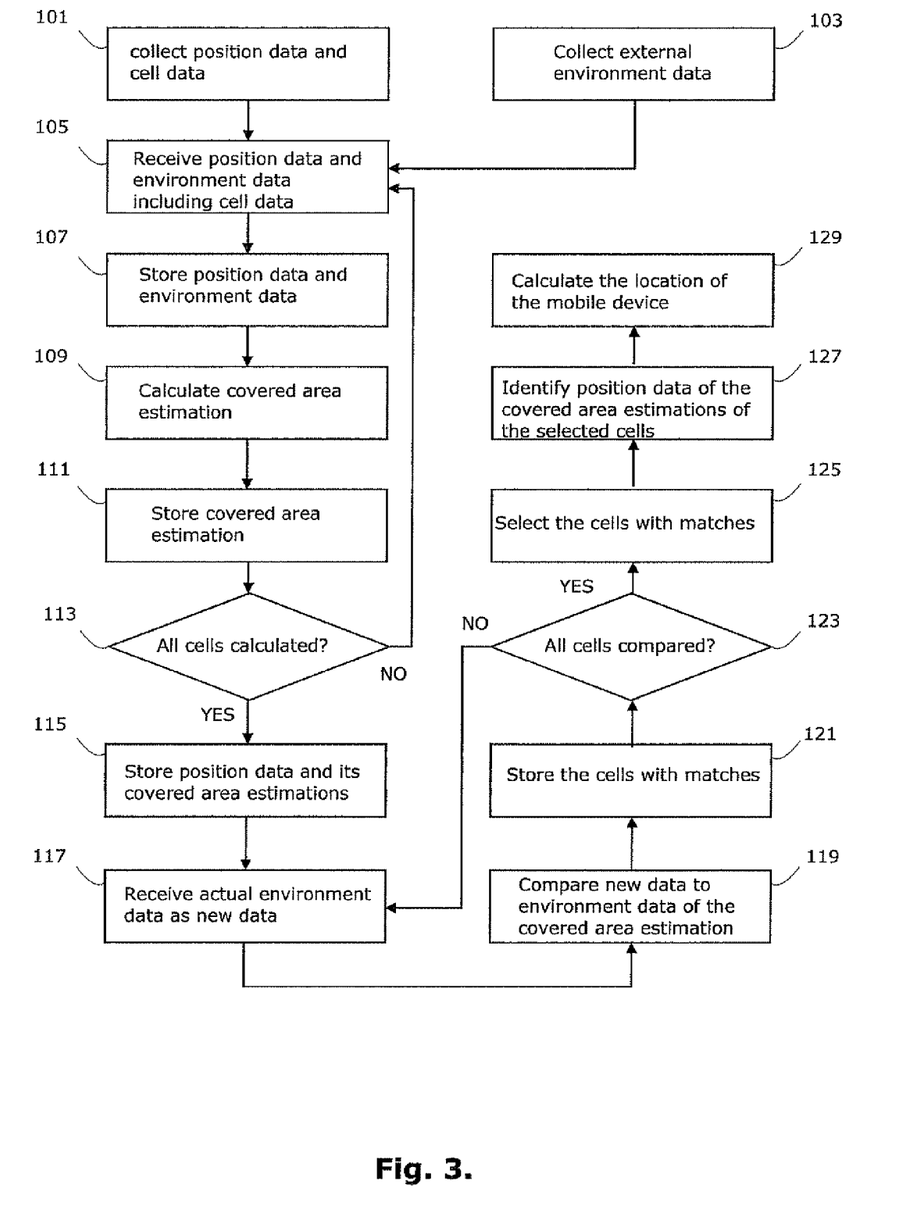
FIG. 3 depicts a flow diagram of a method according to an embodiment of the invention.

In a method according to an embodiment of the invention in order to determine a location of a mobile device 10 is next described with reference to FIG. 3. In step 101 at least positioning data and wireless communication cell data is received and transmitted further. Step 105 depicts receiving and step 107 storing the positioning data and environment data including the cell data of each of a plurality of cells 1a, 1b, 2 associated to the positioning data. Step 109 depicts calculating for each of the plurality of cells 1a, 1b, 2a covered area estimation that is based on the positioning data and the environment data including the cell data. In step 111 the covered area estimation is stored. Step 113 counts that all the cells wherefrom positioning data and environment data is collected have been calculated. step 115 depicts storing all the covered area estimations for each positioning data. In the beginning of the location determination phase step 117 depicts receiving actual environment data including cell data. Then step 119 depicts relatively comparing the actual environment data to the environment data of the covered area estimation of each of the plurality of cells. In step 121 the cells that best match with the actual environment data are stored. Once again step 123 checks that all cells have been compared. Step 125 shows selecting at least one cell from the plurality of cells having the actual environment data that matches to the environment data of the covered area estimation. Step 127 shows identifying position data of the covered area estimation for the selected cells. Finally step 129 shows calculating the location of the mobile device from the positioning data of the covered area estimation of each selected at least one cell. Steps 105 and 117 allow also reception of external environment data that is collected according to step 103. All the detailed features described in connection with the server 14 above are also valid during all corresponding method steps.

The steps 105-115 described above form a process for the mapping phase in which the covered area estimate is calculated based on the positioning data and the environment data including cell data. Steps 117-129 described above form a process for the actual location determination phase. The actual location determination process may follow the mapping phase process or it can be a separate process that is performed one or more times using the positioning data and the environment data including cell data that is resulted from a separate mapping phase process.

In a system, method and module described above the mobile device used in the mapping phase may be another mobile device than the one used in the actual location determination phase. As an example the former mobile device may comprise the GPS receiver 3 or other positioning data receiver, and the latter mobile device may not comprise any particular positioning data receiver 3. This is because there is no need to receive any positioning data in the actual location determination phase.

In a computer program according to an embodiment of the invention there are arranged program code means that are adapted to perform any of the method steps described above when the program is run on a processor 4, 34. The program can be embedded in the processor 4, 34 of the mobile device 10 and/or the server 14.

Figure 4:
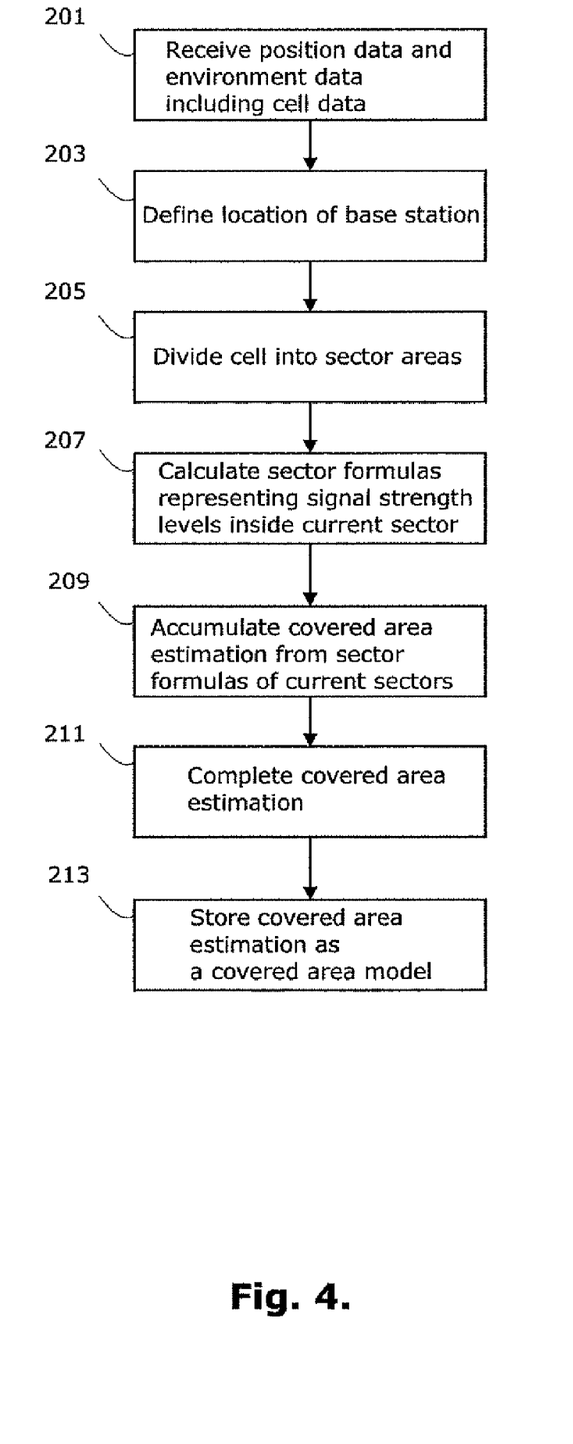
FIG. 4 depicts a flow diagram of a method according to an embodiment of the invention.

In a method according to an embodiment of the invention the mapping phase comprises defining a model for the covered area estimation as shown in FIG. 4. The covered area estimation model for a cell is defined based on received cell data, e.g. GSM, associated to the positioning data, e.g. GPS, step 201. According to step 203 for each cell a location of the transmitting base station is defined. According to an example shown in step 205 data comprising the received positioning data and the received cell data of each cell is divided into sector areas with respect to the location of the base station. Then in step 207 a mathematical formula of sector area is calculated for each sector area so that the sector formulas represent signal strength properties in each sector. The sector formula for each sector area is selected so that the sector formula best matches with available sector data. When calculating the sector formula environmental data including cell data is used so that information on signal behaviour as well as area specific, operator specific, country specific or global information is taken into account. Therefore, the sector formula is not calculated based on received sector data only, although in addition also environmental data is used. Advantage of this is to avoid inadequate sector formulas if there is only small amount of received sector data available. The calculating process according to an embodiment guarantees that the sector formula is adequate because when defining the sector formula also information on signal behaviour as well as area specific, operator specific, country specific or global information is taken into account.

In accordance to above for each divided sector area of the cell the sector formulas representing signal strength properties are defined. Based on these sector formulas and the received cell data and positioning data in step 209 there is accumulated a model of the covered area estimation for the whole cell so that the covered area estimation is composed of free-shaped probability areas for different signal strength levels within the cell. Thus, the covered area estimation of the cell is composed of probability areas according to signal strength levels, such as −75 dBm, −74 dBm, −73 dBm, etc., and at least some of these probability areas may overlap each other. Each signal strength has a set of probability areas, where each probability area describes the probability of the received signal of such signal strength being within the area. If certain inconsistencies and inadequacies are detected in the creation process of the covered area estimation after accumulating step they are corrected and the covered area estimation is completed accordingly in step 211. The model of the covered area estimation (i.e. covered area model) composed of probability areas for different signal strength levels is then stored, for example in a form of Bezier graph or polygons, to a model database 19 being connected to the server 14 according to step 213. Information received from overlapping probability areas can be used to define location data more precisely. Advantage of defining the covered area model according to an embodiment is that there is no need to store single positioning data with associated cell data to the model database 19a and therefore memory and processing capacity is saved both in the mapping phase as well as in the actual location calculation phase. This advantage is apparent when compared to the prior art techniques, such as signal finger printing or other frame based location systems.

In a method according to an embodiment of the invention in order to determine a location of a mobile device 10 is next described with reference to FIG. 5. In the mapping phase in step 301 at least positioning data and wireless communication cell data is received and transmitted further. Step 305 depicts storing the positioning data and environment data including the cell data of each of a plurality of cells 1a, 1b, 2 associated to the positioning data to a cell and position database 19 being connected to the server 14. Step 307 depicts calculating for each of the plurality of cells 1a, 1b, 2a covered area estimation that is based on the positioning data and the environment data including the cell data. According to steps 203-211 of FIG. 4 the sector formulas are calculated for each sector area so that the sector formulas represent signal strength properties in each sector and the covered area estimation is accumulated from the sector formulas. Steps 303 and 309 depicts selecting a piece of information from the model database 19 that matches with environmental data including cell data received from the mobile device 10. According to an embodiment said piece of information is selected from information received along the positioning data and the environmental data including cell data, such as information on a light of the transmitting base station or a width of a signal beam area of the transmitting base station. This piece of information is then used for selecting other information corresponding to the received the positioning data and the environmental data including cell data that can be used to complete the covered area estimation in step 311. In step 313 the covered area estimation is stored for each position data and environmental data including cell data into the model database 19. In this way there is also provided new covered area models into the model database. Step 315 counts that all the cells wherefrom positioning data and environment data including cell data is collected have been calculated.

Figure 5:
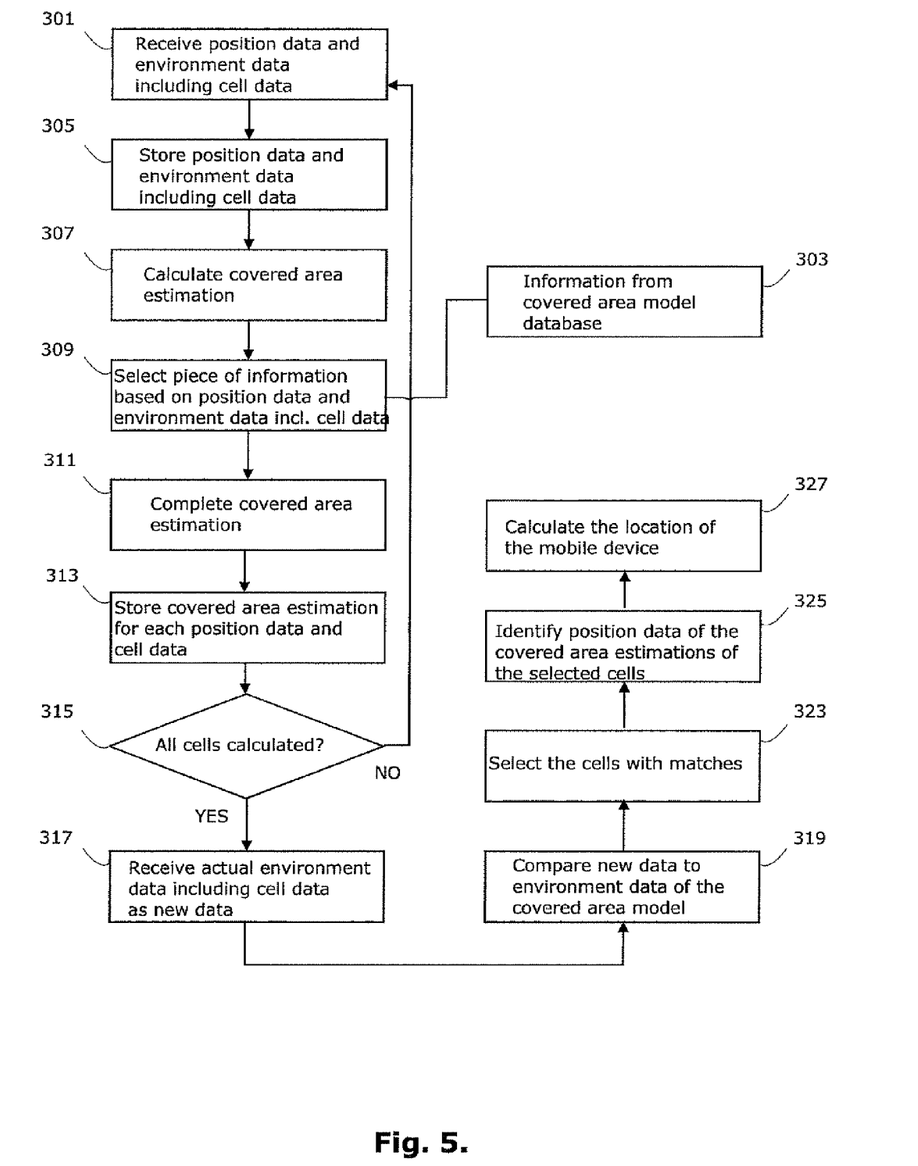
FIG. 5 depicts a flow diagram of a method according to an embodiment of the invention.

In a method according to an embodiment of the invention shown in FIG. 5 the actual location determination phase start in step 317 which depicts the mobile device 10 receiving actual environment data including cell data. The mobile device 10 can be the same device that was used in connection with the mapping phase described above or it can be another device. Then step 319 depicts relatively comparing the actual environment data including cell data to the environment data including cell data of the covered area model for each of the plurality of cells. The environment data including cell data of the covered area model is received from the model database 19 through the server 14. In step 323 the cells that best match with the actual environment data including cell data of the covered area model are selected. Step 325 may also include prioritizing cells of the covered area estimation based on information received along the environmental data including cell data, and the prioritizing information calculated when creating the probability area models. In other words by prioritizing the relative weight of the probability areas of cells are adjusted. In this way cells with low probability areas with respect to signal strength levels and which are therefore less important in determination of the location of the mobile device 10. In this way the covered area estimation is completed in order to determine the location of the mobile device 10. Step 325 shows identifying position data of the covered area estimation for the selected cells. Selection is based on the probability areas for different signal strength levels within each cell according to step 213 of FIG. 4. Finally step 327 shows calculating the location of the mobile device from the positioning data of the covered area estimation of each selected at least one cell. At least steps 309, 311, 319 and 325 also allow reception of positioning data and/or environment data including cell data of the covered area model from the model database 19 according to step 303. All the detailed features earlier described in connection with the server 14 are also valid during all corresponding method steps.

The steps 301-315 described above form a process for the mapping phase in which the covered area estimate is calculated based on the positioning data and the environment data including cell data. Steps 317-327 described above form a process for the actual location determination phase. The actual location determination process may follow the mapping phase process or it can be a separate process that is performed one or more times using the positioning data and the environment data including cell data that is resulted from a separate mapping phase process.

Figure 6:
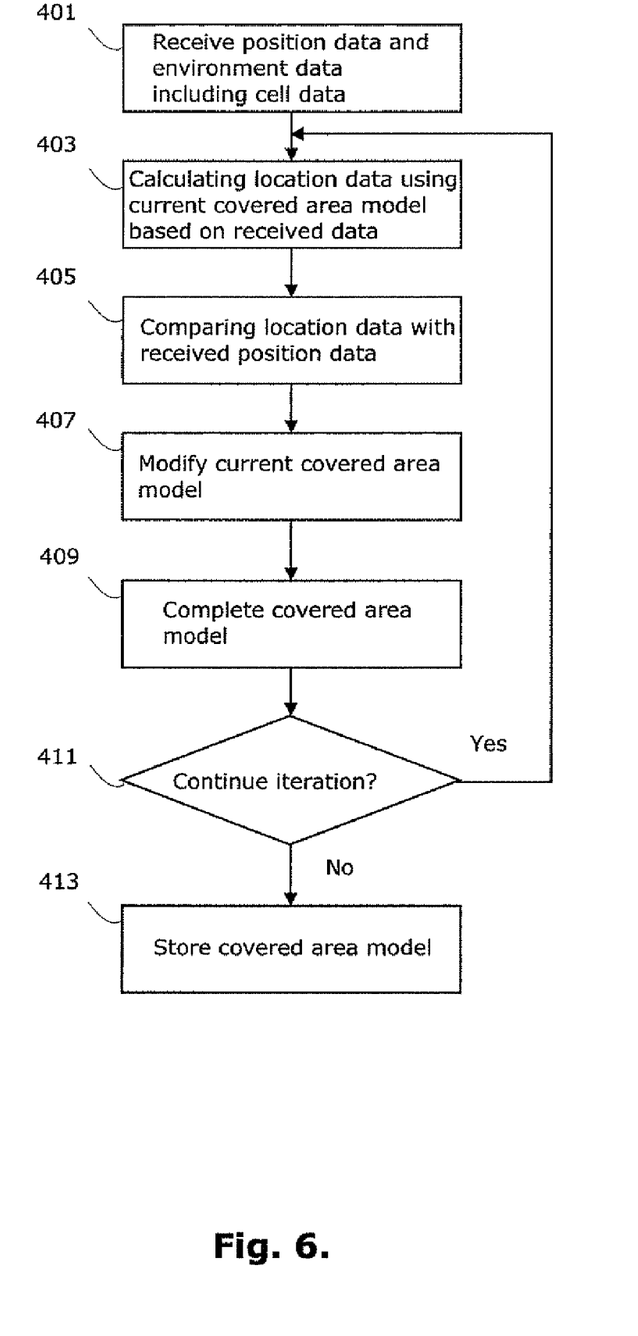
FIG. 6 depicts a flow diagram of a method according to an embodiment of the invention.

In a method according to an embodiment of the invention FIG. 6 depicts a self-learning procedure in order to improve the determination of a location of a mobile device 10. Step 401 shows receiving positioning data and environmental data including cell data from either the cell and positioning database 19 or the mobile device 10. Based on said received data and using current covered area model for said received data there is calculated location data (actual positioning data) for the mobile device 10 according to step 403. Then in step 405 said calculated location data is compared to said received positioning data in step 401. The received positioning data can be reference positioning data that is received from e.g. GPS-receiver or other positioning data source. In step 407 the current covered area model is modified to better fit with said received positioning data and said reference positioning data. Current operator, global or area specific models are also modified in step 407. In the same time current sector formulas (FIG. 3) are modified and consequently the covered area models based on said sector formulas are refined and adjusted to be more precise. Based on this in step 409 the modified covered area models are updated and completed to be more precise and better covered area models. Certain criteria for how much refining is desired for the covered area model is set in step 411. If this criteria is met then the completed covered area model is stored into the model database 19 as an updated covered area model according to step 413. If this criteria is not met and more iteration is desired then the process continues from step 411 to step 403 where the current completed covered area model in step 409 forms a basis for a next current covered area model in step 403.

Figure 7:
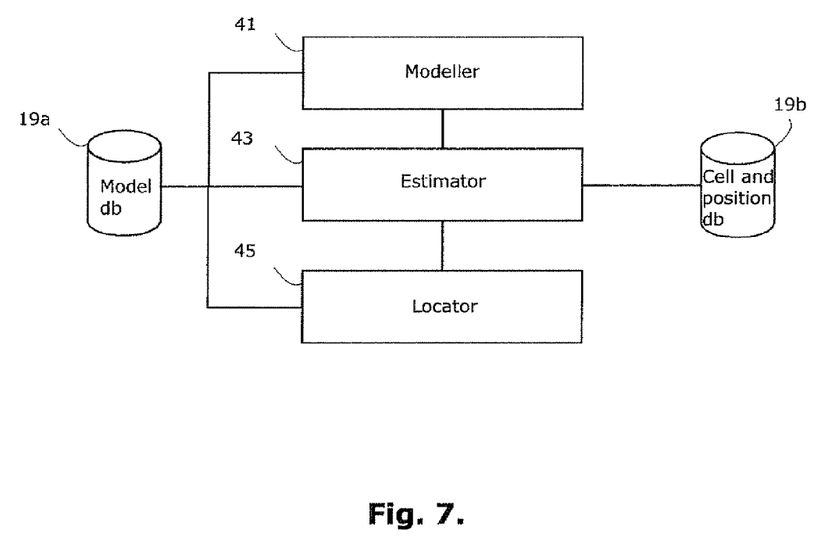
FIG. 7 depicts a block diagram of a module according to an embodiment of the invention.

In a system according to an embodiment of the invention shown in FIG. 7 there is provided a database 19b for storing environmental data including cell data and position data received from the mobile device 10. There is also provided an estimator 43 for calculating covered area estimation for each cell of the plurality of cells 1a, 1b, 2a based on the positioning data and the environment data including the cell data. The estimator 43 calculates (according to steps 203-211 of FIG. 4) the sector formulas for each sector area so that the sector formulas represent signal strength properties in each sector. A modeller 41 accumulates the covered area estimation from the sector formulas and from the received cell data and positioning data. The modeller 41 selects a piece of information from the model database 19a that matches with environmental data including cell data received from the mobile device 10. According to an embodiment said piece of information is selected from information received along the positioning data and the environmental data including cell data, such as frequency scale determined from the ARFCN values so that the modeller 41 can complete the covered area estimation. The modeller 41 transmits the covered area estimation into the model database 19a to stored the the covered area estimation. In this way there is also stored updated covered area models into the model database 19a. In a system there is provided a locator 45 for calculating the location of the mobile device 10 based on the environmental data including cell data.

A server 14 according to an embodiment of the invention shown in FIG. 1b comprises at least one of the following: a modeller 41, an estimator 43 and a locator 45 shown in FIG. 7. In a server 14 a module according to an embodiment of the invention shown in FIG. 1b comprises at least one of the following: a modeller 41, an estimator 43 and a locator 45 shown in FIG. 7. A system according to an embodiment of the invention shown in FIG. 2 comprises a server 14 comprising at least one of the following: a modeller 41, an estimator 43 and a locator 45 shown in FIG. 7.

Figure 8:
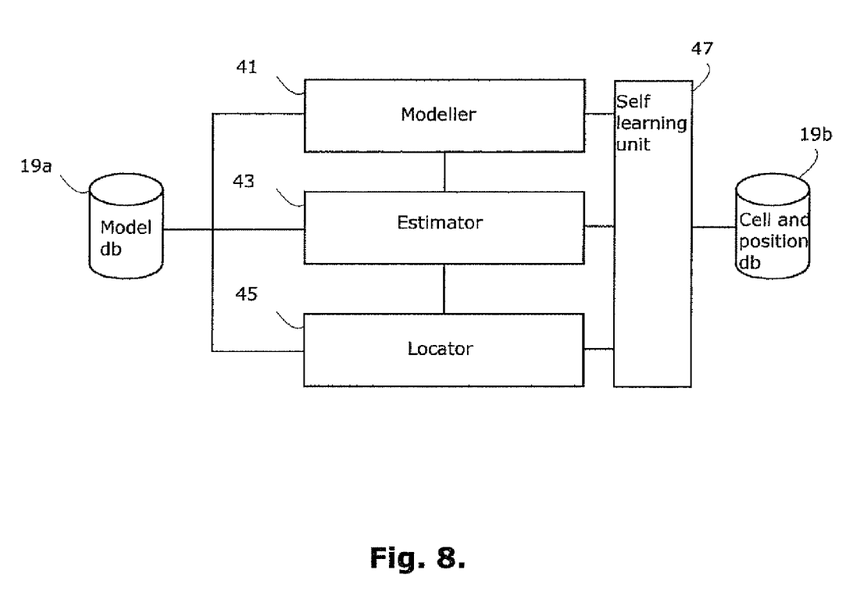
FIG. 8 depicts a block diagram of a module according to an embodiment of the invention.

In a system according to an embodiment of the invention shown in FIG. 8 there is provided a self-learning unit 47 for improving the determination of a location of a mobile device 10. The self-learning unit 47 receives environmental data including cell data and position data either from a cell and positioning database 19b or from the mobile device 10. Then the self-learning unit 47 starts the self-learning procedure. Based on said received data and using current covered area model for said received data a locator 45 calculates location data (actual positioning data) for the mobile device 10. Then the self-learning unit 47 compares said calculated location data to said received positioning data. The received positioning data can be reference positioning data that is received from e.g. GPS-receiver or other positioning data source. The self-learning unit 47 modifies in cooperation with an estimator 43 the sector formulas (FIG. 3) to better fit with said received positioning data. Together with a modeller 41 self-learning unit 47 updates and completes the modified covered area models to be more precise and better covered area models. The self-learning unit 47 continues iteration circles together with the modeller 41, estimator 43 and locator 45 until certain preset criteria for how much refining is desired for the covered area model is met. If this criteria is met then the self-learning unit 47 transmits the completed covered area model to the model database 19a as an updated covered area model and the model database 19a stores the updated covered area model.

A server 14 according to an embodiment of the invention shown in FIG. 1b comprises at least one of the following: a modeller 41, an estimator 43, a locator 45 and a self-learning unit 47 shown in FIG. 8. In a server 14 a module according to an embodiment of the invention shown in FIG. 1b comprises at least one of the following: a modeller 41, an estimator 43, a locator 45 and a self-learning unit 47 shown in FIG. 7. A system according to an embodiment of the invention shown in FIG. 2 comprises a server 14 comprising at least one of the following: a modeller 41, an estimator 43, a locator 45 and and a self-learning unit 47 shown in FIG. 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is intention, therefore, to be limited only as indicated by scope of the claims appended hereto.

The invention claimed is:

1. A method for determining a location of a mobile device configured to receive and transmit further at least positioning data and wireless communication cell data, the method comprising calculating for each of a plurality of cells a covered area estimation based on the received positioning data and the received cell data, completing the covered area estimation with additional data associated to the received position data and the received cell data, wherein the additional data represents at least a shape of the covered area estimation, receiving further actual cell data and relatively comparing the actual cell data to the cell data of the covered area estimation of each of the plurality of cells, selecting at least one cell from the plurality of cells having the actual cell data that matches to the cell data of the covered area estimation, and calculating the location of the mobile device from the position data of the covered area estimation of each selected cell.

2. The method according to claim 1, wherein completing comprises updating the cell data of the covered area estimation with the additional data that relates to the shape of the covered area estimation based on probability of signal strength within each of the plurality of cells.

3. The method according to claim 1, wherein calculating the covered area estimation comprises calculating a location of a transmitting base station of each cell.

4. The method according to claim 3, comprising dividing each of the plurality of cells into sector areas and calculating for each sector area a sector formula representing signal strength levels inside the sector area and accumulating the covered area estimation from the sector formulas.

5. The method according to claim 1, wherein calculating the covered area estimation comprises calculating a transmission range of a transmitting base station of each cell.

6. The method according to claim 1, wherein calculating the covered area estimation comprises calculating a size and shape of each cell based on at least one of the following cell data: radio frequency, absolute radio frequency channel number, receiver signal strength and timing advance.

7. The method according to claim 1, wherein the environment data includes information on signal loss over various ranges, number of base stations and type of base stations.

8. The method according to claim 1, wherein the additional data includes at least one of the following information relating to cell identification, mobile area code, location area code, mobile country code, global or operator specific information.

9. The method according to claim 1, wherein the additional information relates to at least one of the following information received from databases: population density, land topography and city size.

10. A method, comprising calculating for each of a plurality of cells a covered area model based on received positioning data and received cell data, calculating location information based on the received cell data and the calculated covered area model, receiving further actual positioning data and comparing the calculated location information with the received actual positioning data, completing the covered area model with additional data associated to the received position data and the received cell data, wherein the additional data represents at least a shape of the covered area estimation, and storing the completed covered area model into a database.

11. A system for determining a location of a mobile device, wherein the mobile device is configured to collect and transmit further at least positioning data and wireless communication cell data received from a plurality of base station belonging to at least one cellular network, a server is configured to receive and store the positioning data and the cell data of each of the plurality of base stations associated to the position data, the server is configured to calculate for each of the plurality of base stations a covered area estimation based on the positioning data and the cell data, the server is configured to complete the covered area estimation with additional data associated to the received position data and the received cell data, wherein the additional data represents at least a shape of the covered area estimation the server is configured to further receive the cell data and the processor is configured to relatively compare the actual cell data to the cell data of the covered area estimation of each of the plurality of base stations, the server is configured to select at least one base station from the plurality of base stations having the actual cell data that matches to the cell data of the covered area estimation, the server is configured to calculate the location of the mobile device from the positioning data of the covered area estimation of each selected at least one base station, and the server configured to transmit further the location of the mobile device.

12. The system according to claim 11, wherein the server is configured to complete the cell data of the covered area estimation with the additional data that relates to the shape of the covered area estimation based on probability of signal strength within each of the plurality of cells.

13. The system according to claim 11, wherein the server is configured to calculate a location of a transmitting base station of each cell.

14. The system according to claim 13, wherein the server is configured to divide each of the plurality of cells into sector areas and calculate for each sector area a sector formula representing signal strength levels inside the sector area and accumulate the covered area estimation from the sector formulas.

15. The system according to claim 11, wherein the server is configured to calculate for each of a plurality of cells a covered area model based on received positioning data and received cell data, calculate location information based on the received positioning data and the calculated covered area model, receive further actual positioning data and compare the calculated location information with the received actual positioning data, complete the covered area model with additional data associated to the received position data and the received cell data, wherein the additional data represents at least a shape of the covered area estimation, and transmit the completed covered area model into a database for storing.

16. A module for determining a location of a mobile device configured to receive and transmit further at least positioning data and wireless communication cell data, the module comprising a receiver configured to receive and a memory configured to store the positioning data and the cell data of each of the plurality of base stations associated to the position data, an estimator configured to calculate for each of the plurality of base stations a covered area estimation based on the positioning data and the cell data, a modeler configured to complete the covered area estimation with additional data associated to the received position data and the received cell data, wherein the additional data represents at least a shape of the covered area estimation a locator configured to further receive actual cell data, the estimator configured to relatively compare the actual cell data to the cell data of the covered area estimation of each of the plurality of base stations, a selector configured to select at least one base station from the plurality of base stations having the actual cell data that matches to the cell data of the covered area estimation, and the locator configured to calculate the location of the mobile device from the positioning data of the covered area estimation of each selected at least one base station.

17. The module according to claim 16, wherein the modeler is configured to complete the cell data of the covered area estimation with the additional data that relates to the shape of the covered area estimation based on probability of signal strength within each of the plurality of cells.

18. The module according to claim 16, wherein the modeler is configured to calculate a location of a transmitting base station of each cell.

19. The module according to claim 18, wherein the modeler is configured to divide each of the plurality of cells into sector areas and calculate for each sector area a sector formula representing signal strength levels inside the sector area and accumulate the covered area estimation from the sector formulas.

20. The module according to claim 16, further comprising a self-learning unit configured to communicate with a modeler in order to calculate for each of a plurality of cells a covered area model based on received positioning data and received cell data, communicate with a locator in order to calculate location information based on the received positioning data and the calculated covered area model, receive further actual positioning data, compare the calculated location information with the received actual positioning data, communicate with an estimator in order to create sector formulas for each of the plurality of cells for updating the covered area model, and communicate with a modeler in order to complete the covered area model with additional data associated to the received position data and the received cell data, wherein the additional data represents at least a shape of the covered area estimation, and transmit the completed covered area model into a database for storing.

* * * * *